US012689218B2

(12) United States Patent
Zhang et al.

(10) Patent No.: US 12,689,218 B2
(45) Date of Patent: Jul. 21, 2026

(54) PHOTOVOLTAIC GRID-CONNECTED SYSTEM AND CONTROL METHOD THEREFOR

(71) Applicant: Sungrow Power Supply Co., Ltd., Hefei (CN)

(72) Inventors: Yuanze Zhang, Hefei (CN); Jun Xu, Hefei (CN); Wei Zhao, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 244 days.

(21) Appl. No.: 18/129,273

(22) Filed: Mar. 31, 2023

(65) Prior Publication Data

US 2023/0318298 A1 Oct. 5, 2023

(30) Foreign Application Priority Data

Mar. 31, 2022 (CN) .......................... 202210331500.8

(51) Int. Cl.
*H02J 3/1885* (2026.01)
*H02J 3/38* (2026.01)
(Continued)

(52) U.S. Cl.
CPC ............ *H02J 3/1885* (2013.01); *H02J 3/381* (2013.01); *H02J 3/40* (2013.01); *H02J 2101/25* (2026.01);
(Continued)

(58) Field of Classification Search
CPC .... H02J 3/1885; H02J 3/1892; H02J 3/40–46; H02J 3/381; H02J 2300/26;
(Continued)

(56) References Cited

U.S. PATENT DOCUMENTS

| | | | | | |
|---|---|---|---|---|---|
| 6,670,721 | B2* | 12/2003 | Lof | ........................... | H02J 3/48 |
| | | | | | 290/44 |
| 8,115,426 | B2* | 2/2012 | Beck | ......................... | H02J 3/42 |
| | | | | | 318/140 |

(Continued)

FOREIGN PATENT DOCUMENTS

| | | | |
|---|---|---|---|
| CN | 105244911 A | * | 1/2016 |
| CN | 105305478 A | | 2/2016 |

(Continued)

OTHER PUBLICATIONS

Machine translation of CN-105244911-A. Obtained from internal USPTO databases. (Year: 2016).*

(Continued)

*Primary Examiner* — Fred E Finch, III
(74) *Attorney, Agent, or Firm* — Wolf, Greenfield & Sacks, P.C.

(57) ABSTRACT

A photovoltaic grid-connected system and a control method therefor. The photovoltaic inverter is connected to the grid through a synchronous motor back-to-back drive system including two synchronous motors. The photovoltaic inverter is controlled to operate in the current source mode after the photovoltaic grid-connected system is started, the synchronous motor back-to-back drive system is controlled to operate in the generator mode, and the excitation current of the first synchronous motor is controlled to maintain the voltage stability of the AC side of the photovoltaic inverter. Therefore, the stability and safety of the power grid is significantly improved and the impact of intermittent new energy on the power grid is reduced by virtue of the characteristics of the synchronous motor, and the maximum power point of the photovoltaic array can be tracked to avoid loss of power generation, and traditional photovoltaic inverters can be used without any modification.

12 Claims, 11 Drawing Sheets

(51) Int. Cl.

| | | |
|---|---|---|
| *H02J 3/40* | (2026.01) | |
| *H02J 101/24* | (2026.01) | |
| *H02M 1/36* | (2007.01) | |
| *H02M 7/5387* | (2007.01) | |

(52) U.S. Cl.
CPC .......... *H02M 1/36* (2013.01); *H02M 7/53876* (2021.05); *Y02E 10/56* (2013.01)

(58) Field of Classification Search
CPC ...... H02M 1/36; H02M 7/537; H02M 7/5387; H02M 7/53871; H02M 7/53875; H02M 7/53876; H02M 7/54; H02M 7/64; H02M 7/86; H02M 7/98; H02P 1/46; H02P 1/48; H02P 1/50; H02P 9/08; H02P 9/10–105; Y02E 10/56
See application file for complete search history.

(56) References Cited

U.S. PATENT DOCUMENTS

| | | | | |
|---|---|---|---|---|
| 2014/0042818 | A1* | 2/2014 | Blacha | H10F 77/955 |
| | | | | 307/77 |
| 2020/0212823 | A1 | 7/2020 | Gong | |
| 2022/0247183 | A1* | 8/2022 | Chen | H02P 9/105 |
| 2023/0243338 | A1* | 8/2023 | Matuonto | F03D 7/0284 |
| | | | | 290/44 |

FOREIGN PATENT DOCUMENTS

| | | | | | | |
|---|---|---|---|---|---|---|
| CN | 105656081 | A | * | 6/2016 | | |
| CN | 109245161 | A | | 1/2019 | | |
| CN | 111416381 | A | * | 7/2020 | | |
| CN | 112271757 | A | | 1/2021 | | |
| CN | 114094633 | A | | 2/2022 | | |
| WO | WO-2021255002 | A1 | * | 12/2021 | .......... | F03D 7/0284 |

OTHER PUBLICATIONS

Machine translation of CN-105656081-A. Obtained from internal USPTO databases. (Year: 2016).*
Machine translation of CN-111416381-A. Obtained from internal USPTO databases. (Year: 2020).*
U.S. Nuclear Regulatory Commission, Human Resources Training & Development, "Generator, Exciter, and Voltage Regulator," in Emergency Diesel Generator. USNRC, 2011, ch. 9. Available: https://www.nrc.gov/docs/ml1122/ML11229A061.html (Year: 2011).*
IEEE Recommended Practice for Excitation System Models for Power System Stability Studies, in IEEE Std 421.May 2016 (Revision of IEEE Std 421.5-2005), Aug. 26, 2016, doi: 10.1109/IEEESTD.2016.7553421. (Year: 2016).*
"IEEE Standard Definitions for Excitation Systems for Synchronous Machines," in IEEE Std 421.Jan. 2021 (Revision of IEEE Std 421.1-2007), Mar. 17, 2022, doi: 10.1109/IEEESTD.2022.9737077. (Year: 2022).*
First Office Action for Chinese Application No. 202210331500.8, dated May 27, 2025.

* cited by examiner

PHOTOVOLTAIC GRID-CONNECTED SYSTEM AND CONTROL METHOD THEREFOR

The present disclosure claims priority to Chinese Patent Application No. 202210331500.8, titled "PHOTOVOLTAIC GRID-CONNECTED SYSTEM AND CONTROL METHOD THEREFOR", filed on Mar. 31, 2022, with the China National Intellectual Property Administration, which is incorporated herein by reference in its entirety.

FIELD

The present disclosure relates to the field of photovoltaic grid-connected technology, and in particular, to a photovoltaic grid-connected system and a control method therefor.

BACKGROUND

With the advancement of the transition from fossil energy to renewable energy, the penetration rate of renewable energy, mainly photovoltaic and wind power, is increasing rapidly worldwide. Therefore, the proportion of installed capacity of conventional synchronous generators, especially coal-fired steam turbines, is decreasing year by year. The decrease in the proportion of installed capacity of synchronous generators will lead to a decrease in the inertia of the power system and insufficient transient voltage and current support capabilities, resulting in reduced system stability and inability to ensure the grid frequency safety in extreme weather or a sudden failure. In addition, when a fault occurs, a large number of new energy units are prone to be off-grid, resulting in regional large-scale power outages.

SUMMARY

In view of the above, a photovoltaic grid-connected system and a control method therefor are provided according to the present disclosure, to provide a power grid with system inertia support and improve the stability and safety of the power grid.

To this end, the following technical solutions are provided according to the present disclosure as follows.

According to a first aspect of the present disclosure, a control method for a photovoltaic grid-connected system is provided. The photovoltaic grid-connected system includes a photovoltaic array, a photovoltaic inverter, a synchronous motor back-to-back drive system and a transformer that are connected in series in sequence. The transformer is configured to connect to a power grid. In the synchronous motor back-to-back drive system, a rotor shaft of a first synchronous motor and a rotor shaft of a second synchronous motor are connected through a mechanical shaft. The control method includes:

controlling the photovoltaic inverter to operate in a current source mode after the photovoltaic grid-connected system is started; and controlling the synchronous motor back-to-back drive system to operate in a generator mode, and controlling an excitation current of the first synchronous motor to maintain voltage stability of an alternating current side of the photovoltaic inverter.

In an embodiment, the controlling the photovoltaic inverter to operate in the current source mode includes:

controlling the photovoltaic inverter to operate in a maximum power point tracking (MPPT) current source control mode.

In an embodiment, the controlling the photovoltaic inverter to operate in the current source mode further includes:

controlling, when an active power dispatching command is received and an active power command value is less than a maximum power of the photovoltaic array, the photovoltaic inverter to operate in the current source mode according to the active power command value.

In an embodiment, when controlling the synchronous motor back-to-back drive system to operate in the generator mode, the method further includes:

controlling an excitation current of the second synchronous motor to achieve a corresponding power factor according to a reactive power command value in a received reactive power dispatching command.

In an embodiment, before or after any step, the method further includes:

controlling, when a stator winding of the first synchronous motor has no input power, the synchronous motor back-to-back drive system to operate in a synchronous condenser mode.

In an embodiment, the photovoltaic grid-connected system further includes a black start system, a first switch, a second switch and a third switch. The first switch is arranged between an alternating current side of the photovoltaic inverter and a stator winding of the first synchronous motor. The black start system is connected to the stator winding of the first synchronous motor through the third switch. The second switch is arranged between a stator winding of the second synchronous motor and the transformer. Before the controlling the photovoltaic inverter to operate in the current source mode, the control method further comprises:

controlling the black start system, the first switch, the second switch and the third switch to operate respectively to start the photovoltaic grid-connected system.

In an embodiment, the controlling the black start system, the first switch, the second switch and the third switch to operate respectively to start the photovoltaic grid-connected system includes:

switching on the third switch to connect the black start system to the stator winding of the first synchronous motor to perform a black start process;

switching on the second switch and switching off the third switch when a stator speed of the synchronous motor back-to-back drive system reaches a power grid synchronous speed, so that the synchronous motor back-to-back drive system operates in a synchronous condenser mode;

controlling, when the photovoltaic array meets a power generation condition, the excitation current of the first synchronous motor to adjust a voltage at a stator winding side of the first synchronous motor to be within an operation range of a grid-connected voltage of the photovoltaic inverter; and adjusting, when the photovoltaic inverter meets a start condition, an output at the alternating current side of the photovoltaic inverter to an alternating current synchronized with the voltage at the stator winding side of the first synchronous motor, and switching on the first switch.

In an embodiment, after the controlling the photovoltaic inverter to operate in the current source mode, the method further includes:

controlling, when the photovoltaic inverter meets a shutdown condition, the photovoltaic inverter to stop operation, and switching off the first switch, so that the stator winding of the first synchronous motor has no input power.

According to a second aspect of the present disclosure, a photovoltaic grid-connected system is provided. The system includes: a photovoltaic array, at least one photovoltaic inverter, a synchronous motor back-to-back drive system, a transformer and a control system connected in series in sequence; where the synchronous motor back-to-back drive system comprises a first synchronous motor and a second synchronous motor, and a rotor shaft of the first synchronous motor and a rotor shaft of the second synchronous motor are connected through a mechanical shaft;

a direct current side of the at least one photovoltaic inverter is connected to a corresponding photovoltaic string in the photovoltaic array;

an alternating current side of the at least one photovoltaic inverter is connected to a stator winding of the first synchronous motor; and a stator winding of the second synchronous motor is connected to a power grid through the transformer;

where the control system is configured to execute any one of the control method for the photovoltaic grid-connected system according to the first aspect.

In an embodiment, the photovoltaic grid-connected system further includes: a black start system, a first switch, a second switch and a third switch; where the first switch is arranged between the alternating current side of the at least one photovoltaic inverter and the stator winding of the first synchronous motor;

the black start system is connected to the stator winding of the first synchronous motor through the third switch; and the second switch is arranged between the stator winding of the second synchronous motor and the transformer.

In an embodiment, the control system includes: a first controller, a second controller, a third controller, and a fourth controller; where the first controller integrated in the at least one photovoltaic inverter is configured for controlling operation of the at least one photovoltaic inverter;

the second controller integrated in the first synchronous motor is configured for controlling the excitation current of the first synchronous motor;

the third controller integrated in the second synchronous motor is configured for controlling an excitation current of the second synchronous motor;

the fourth controller integrated in the black start system is configured for controlling the black start system to perform a black start process; and the first controller is communicatively connected with the second controller, the third controller and the fourth controller, respectively.

According to the control method for the photovoltaic grid-connected system provided in the present disclosure, in the photovoltaic grid-connected system to which the control method is applied, the synchronous motor back-to-back drive system including two synchronous motors is add. Rotor shafts of the two synchronous motors are connected through the mechanical shaft. Then, the photovoltaic inverter is connected to the power grid through the synchronous motor back-to-back drive system including the two synchronous motors. Compared with the photovoltaic array being directly connected to the power grid through the photovoltaic inverter in the conventional technology, the stability and safety of the power grid is significantly improved and the impact of intermittent new energy on the power grid is reduced in the present disclosure, by virtue of the following characteristics of the synchronous motor: the synchronous motor having strong resistance to voltage and current and strong transient overload capacity, the synchronous motor being able to operate continuously during grid failures, and the synchronous motor having an inherent mechanical moment of inertia. Furthermore, in the control method, the photovoltaic inverter is controlled to operate in the current source mode after the photovoltaic grid-connected system is started, the synchronous motor back-to-back drive system is controlled to operate in the generator mode, and the excitation current of the first synchronous motor is controlled to maintain the voltage stability of the alternating current side of the photovoltaic inverter. Therefore, in the present disclosure, the maximum power point of the photovoltaic array can be tracked to avoid loss of power generation, and traditional photovoltaic inverters can be used without any modification.

BRIEF DESCRIPTION OF THE DRAWINGS

For clearer illustration of the technical solutions according to embodiments of the present disclosure or conventional technology, hereinafter are briefly described the drawings to be applied in embodiments of the present disclosure or conventional technology. Apparently, the drawings in the following descriptions are only some embodiments of the present disclosure, and other drawings may be obtained by those skilled in the art based on the provided drawings without creative efforts.

DETAILED DESCRIPTION OF EMBODIMENTS

The technical solutions in the embodiments of the present disclosure will be described clearly and completely hereinafter in combination with the drawings in the embodiments of the present disclosure. Apparently, the described embodiments are merely parts of the embodiments of the disclosure, rather than all the embodiments. Based on the embodiments of the present disclosure, all other embodiments obtained by those skilled in the art without creative efforts pertain to the protection scope of the present disclosure.

In the present disclosure, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

Currently, due to the high proportion and low system inertia of new energy generation based on photovoltaic and wind power, the grid frequency safety cannot be guaranteed in extreme weather or a sudden failure. In addition, when a fault occurs, a large number of new energy units are prone to be off-grid, resulting in regional large-scale power outages.

In the conventional photovoltaic grid-connected solution, the photovoltaic module outputs the direct current, which is converted into the alternating current through the power electronic converter and then connected to the grid. In this system, there is a lack of rotating mechanical inertia such as a rotor of a synchronous generator, which cannot provide natural inertia support for the system. Therefore, a control method for a photovoltaic grid-connected system is provided according to the present disclosure, in which a synchronous motor back-to-back drive system including two synchronous motors is added in the photovoltaic grid-connected system to provide system inertia support for the power grid, thereby improving the stability and safety of the power grid.

Figure 1:
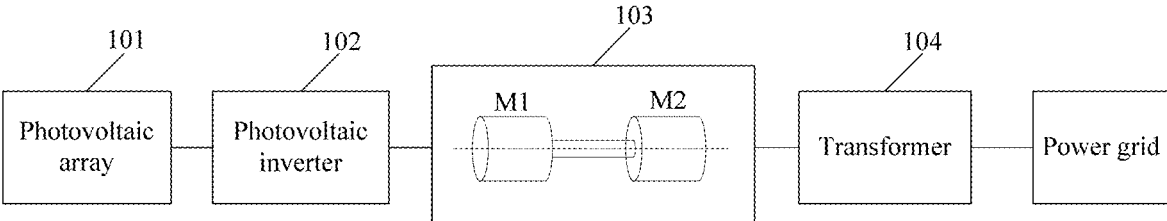
FIG. 1 is a schematic structural diagram of a photovoltaic grid-connected system according to an embodiment of the present disclosure.

As shown in FIG. 1, a photovoltaic grid-connected system includes: a photovoltaic array 101, a photovoltaic inverter 102, a synchronous motor back-to-back drive system 103, and a transformer 104, which are connected in series in sequence. Another side of the transformer 104 is connected to a power grid. In the synchronous motor back-to-back drive system 103, a rotor shaft of a first synchronous motor M1 and a rotor shaft of a second synchronous motor M2 are connected through a mechanical shaft, so that the two synchronous motors always maintain the same rotational speed.

Figure 2:
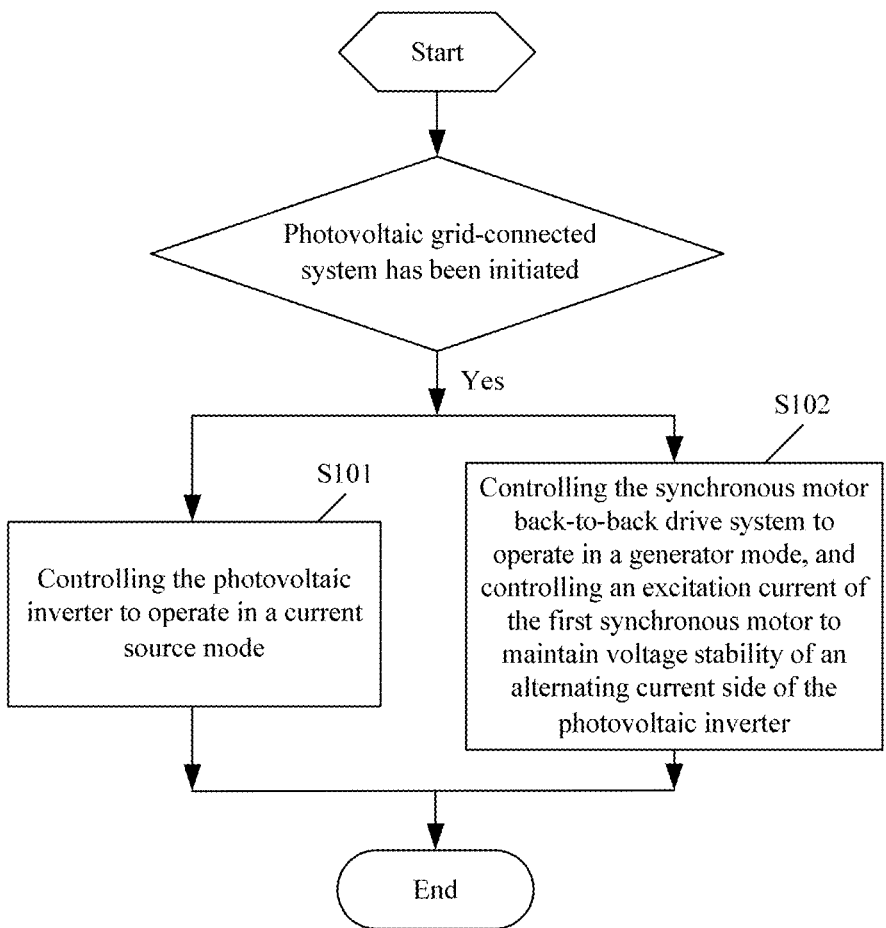
FIG. 2 is a flowchart of a control method for a photovoltaic grid-connected system according to an embodiment of the present disclosure.

As shown in FIG. 2, the control method includes the following steps to be performed after the photovoltaic grid-connected system is started.

In step S101, the photovoltaic inverter is controlled to operate in a current source mode.

After the system is started, the photovoltaic inverter 102 is controlled to operate in the current source mode. For example, in the currently commonly used MPPT (Maximum Power Point Tracking) current source control mode, it is possible to track the maximum power point of the photovoltaic array 101 and connect all the power generated on the photovoltaic side to the grid. Compared with the power conversion device that use the voltage source mode to control through the frequency droop control strategy, the loss of power generation can be avoided in step S101.

Since the output power of the photovoltaic inverter 102 changes with the irradiation intensity, the stator current of the first synchronous motor M1 will also change accordingly. In order to ensure that the voltage at the stator winding side of the first synchronous motor M1 remains unchanged, it is necessary to perform step S102.

In step S102, the synchronous motor back-to-back drive system is controlled to operate in a generator mode, and an excitation current of the first synchronous motor is controlled to maintain voltage stability of an alternating current side of the photovoltaic inverter.

The stator voltage equation of the synchronous motor is:

$$U = E_0 - IR_a - jI_dX_d - jI_qX_q \qquad \text{Equation (1)}$$

where U represents the effective value of the voltage at the stator winding side of the synchronous motor, $E_0$ represents the excitation electromotive force, I represents the effective value of the stator current, $R_a$ represents the resistance of the stator armature, $I_d$ and $I_q$ represent the quadrature axis component and direct axis component of the stator current respectively, and $X_d$ and $X_q$ represent the quadrature axis reactance and direct axis reactance of the stator winding respectively.

Figure 3:
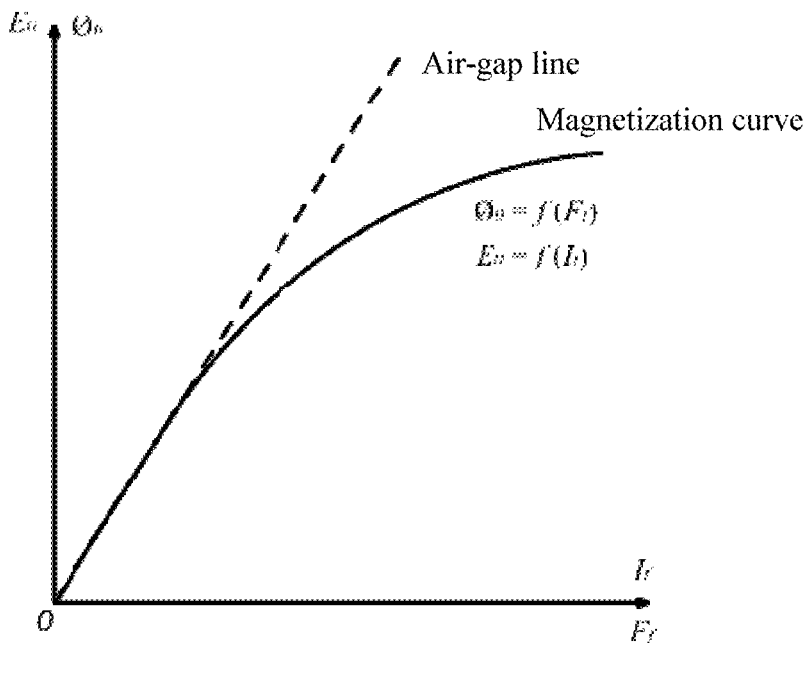
FIG. 3 is a schematic waveform diagram of a magnetization curve of a synchronous motor according to an embodiment of the present disclosure.

It can be seen from the equation (1) that, the voltage at the stator winding side is related to the excitation electromotive force $E_0$ and the stator current I. In order to ensure that the voltage at the stator winding side remains unchanged, when the stator current I changes, the voltage at the stator winding side can be maintained constant by adjusting the excitation electromotive force $E_0$ as follows:

$$E_0 = 4.44 f N k_N \Phi_0 \qquad \text{Equation (2)}$$

where f represents the three-phase fundamental wave electromotive force induced by cutting the stator winding with the main magnetic flux, N represents the number of series turns of each phase of the stator winding, $k_N$ represents the winding coefficient, and $\Phi_0$ represents the air gap main magnetic flux. At the rated frequency f, N, and $k_N$ are all constants. As shown in FIG. 3, different air gap main magnetic fluxes $\Phi_0$ can be obtained by changing the excitation current $I_f$, so as to obtain different excitation electromotive forces $E_0$. In this way, it is possible to stabilize the stator voltage of the first synchronous motor M1 in the synchronous motor back-to-back drive system 103 under various photovoltaic power generation conditions, that is, to stabilize the voltage at the alternating current side of the photovoltaic inverter 102. In FIG. 3, $F_f$ represents the frequency.

Compared with the photovoltaic array being directly connected to the power grid through the photovoltaic inverter in the conventional technology, the photovoltaic inverter in the present disclosure is connected to the power grid through the synchronous motor back-to-back drive system including the two synchronous motors, thus, the stability and safety of the power grid is significantly improved and the impact of intermittent new energy on the power grid is reduced by virtue of the following characteristics of the synchronous motor: the synchronous motor having strong resistance to voltage and current and strong transient overload capacity, the synchronous motor being able to operate continuously during grid failures, and the synchronous motor having an inherent mechanical moment of inertia.

In the control method for the photovoltaic grid-connected system according to the embodiments of the present disclosure, the maximum power point of the photovoltaic array can be tracked, so as to avoid the loss of power generation. Furthermore, traditional photovoltaic inverters can be used as the photovoltaic inverter in this embodiment without any modification.

It should be noted that there are also conventional technologies that use the virtual synchronous motor for control, in which power electronic devices are used to simulate the inertia, damping, and other characteristics of the synchronous motor. However, due to the problems such as parallel operation of multiple machines, transient overcurrent capability, and voltage recovery after low voltage ride through, this technology has not yet been fully applied. Even if the control technology of virtual synchronous motor is well developed, the inertia support speed of the virtual synchronous motor still has a delay compared with the natural mechanical inertia of the synchronous motor. As a result, it is still unable to meet the requirements for system frequency stability under the extreme operation condition with an approximately 100% penetration rate of new energy.

In the control method for the photovoltaic grid-connected system according to the embodiment of the present disclosure, the photovoltaic grid-connected system to which the control method is applied relies on the inherent mechanical rotational inertia of the synchronous motor. The inertia support speed of the inherent mechanical rotational inertia is fast, and the requirements for the system frequency stability are met.

On the basis of the previous embodiment, in an embodiment, the step S101 may specifically include: controlling the photovoltaic inverter to operate in the MPPT current source control mode. Alternatively, if an active power dispatching command is received and an active power command value is less than a maximum power of the photovoltaic array, then the step S101 may also include: controlling the photovoltaic inverter to operate in the current source mode according to the active power command value.

Figure 4:
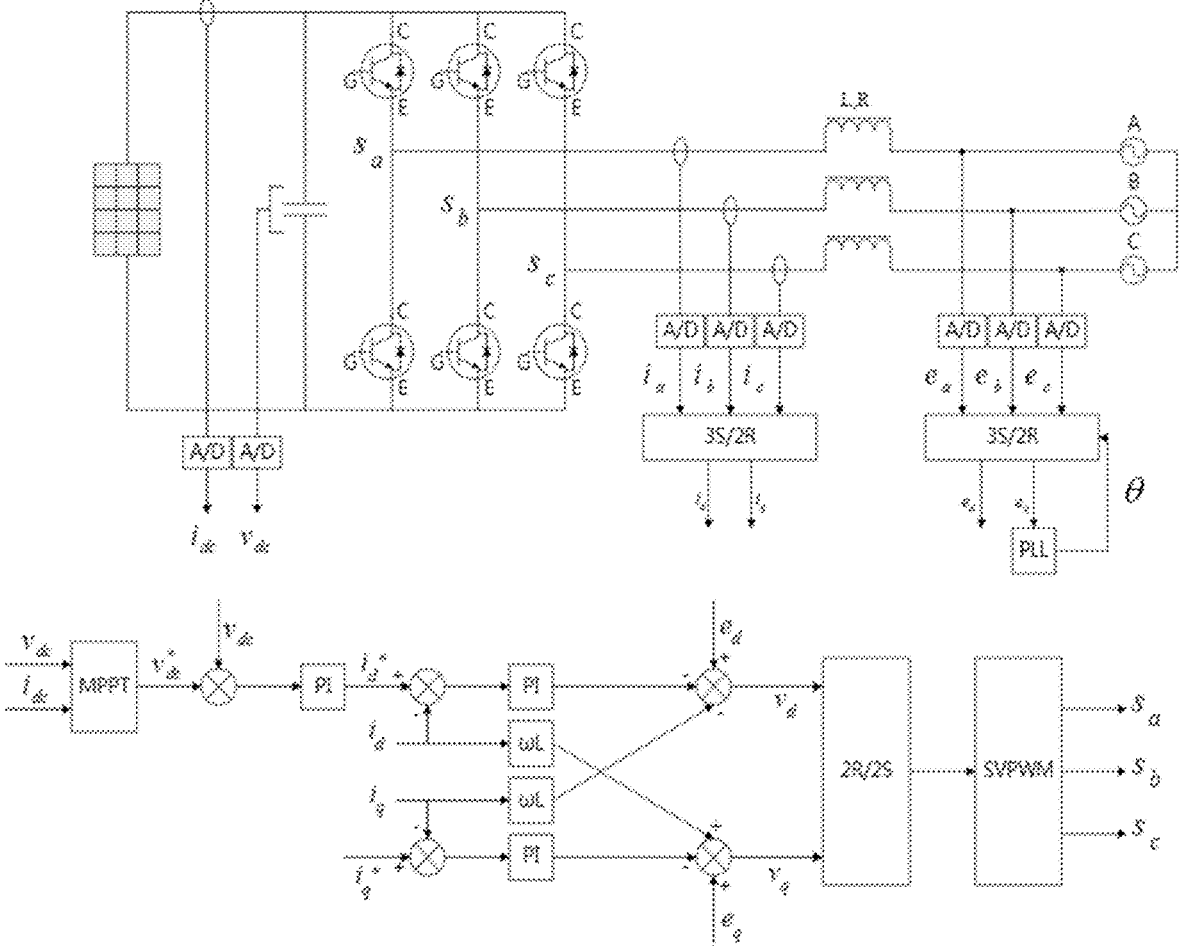
FIG. 4 is a control block diagram of a photovoltaic inverter according to an embodiment of the present disclosure.

The control strategy of the photovoltaic inverter can be the conventional double-loop control of voltage and current shown in FIG. 4. Since the specific processes are the same as that of the conventional technology, the details of which are omitted here for concision. In FIG. 4, $v_{dc}$ represents the actual voltage at the direct current side of the photovoltaic inverter 102; $i_{dc}$ represents the actual current at the direct current side of the photovoltaic inverter 102; $v^*_{dc}$ represents the reference value of the direct current voltage; $i_d$ represents the d-axis component of the current at the alternating current side of the photovoltaic inverter 102; $i_d^*$ represents the reference value of the d-axis component of the current at the alternating current side of the photovoltaic inverter 102; $i_q$ represents the q-axis component of the current at the alternating current side of the photovoltaic inverter 102; $i_q^*$ represents the reference value of the q-axis component of the current at the alternating current side of the photovoltaic inverter 102; $e_d$ and $e_q$ represent the d-axis and q-axis components of the power grid voltage respectively; $v_d$ and $v_q$ represent the d-axis and q-axis components of the voltage command value respectively; $S_a$, $S_b$ and $S_c$ represent the pulse width modulation waves of phase A, phase B and phase C respectively; $e_a$, $e_b$ and $e_c$ represent the alternating current voltage of the stator windings of phase A, phase B and phase C of the synchronous motor, $i_a$, $i_b$ and $i_c$ represent the three-phase currents at the alternating current side of the photovoltaic inverter 102; and $\theta$ represent the phase angle of the voltage at the stator winding of the first synchronous motor. In practical applications, the control of the photovoltaic inverter can utilize MPPT mode or power command mode. In different modes, the system may specifically have different states as follows.

In a first state: the photovoltaic power station generates electricity, the photovoltaic inverter 102 operates in the MPPT mode, and the synchronous motor back-to-back drive system 103 operates in the generator mode. In this case, the magnetic field induced by the three-phase current of the stator of the first synchronous motor M1 is ahead of the rotor angle $\theta$ rad of the first synchronous motor M1 in the synchronous motor back-to-back drive system 103, the first synchronous motor M1 operates in the motor mode as a prime mover to convert the electric power inputted by the photovoltaic inverter 102 into mechanical power and transmit the mechanical power to the second synchronous motor M2 through the rotating shaft. At this time, the rotor angle of the second synchronous motor M2 is ahead of the stator magnetic field angle, and the second synchronous motor M2 is in the generator state, to convert the mechanical power transmitted from the first synchronous motor M1 into electrical power and transmit the electrical power to the power grid.

Compared with the photovoltaic inverter being directly connected to the power grid for power generation, the photovoltaic grid-connected system has the characteristics of large system inertia and large short-circuit capacity in this state. Since the rotors of the first synchronous motor M1 and the second synchronous motor M2 naturally have the mechanical rotational inertia with the system inertia constant H of 2-4 s, the rotational speed of the rotor of the second synchronous motor M2 cannot suddenly change due to the inertia when the output power of the photovoltaic array 101 changes, which slows down the rate of change of frequency (RoCoF) of the system, provides more ample time for the primary frequency modulation of the system, and increases the frequency stability of the power grid. Also, the damping characteristic of the external synchronous motor reduces the risk of grid resonance.

In a second state: the photovoltaic power station generates electricity, the photovoltaic inverter 102 operates in the power dispatching mode, and the synchronous motor back-to-back drive system 103 operates in the generator mode. When the active power dispatching command is received and the active power command value P is less than the maximum power of the photovoltaic array, the active power of the photovoltaic inverter 102 may be maintained at the command value P. At this time, the power angle between the first synchronous motor M1 and the second synchronous motor M2 remains constant, and the second synchronous motor M2 outputs constant active power to the grid-connected.

Figure 5:
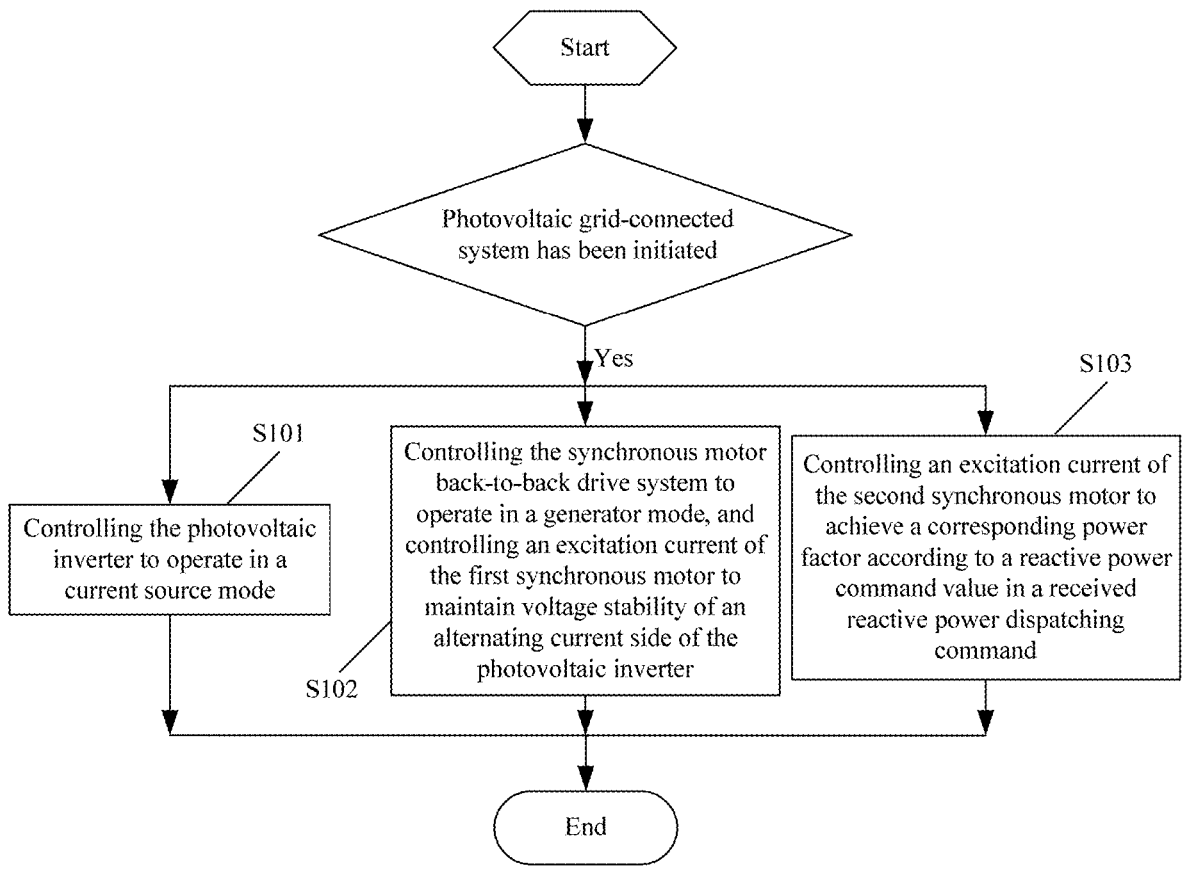
FIG. 5 is a flowchart of a control method of a photovoltaic grid-connected system according to another embodiment of the present disclosure.
Figure 6:
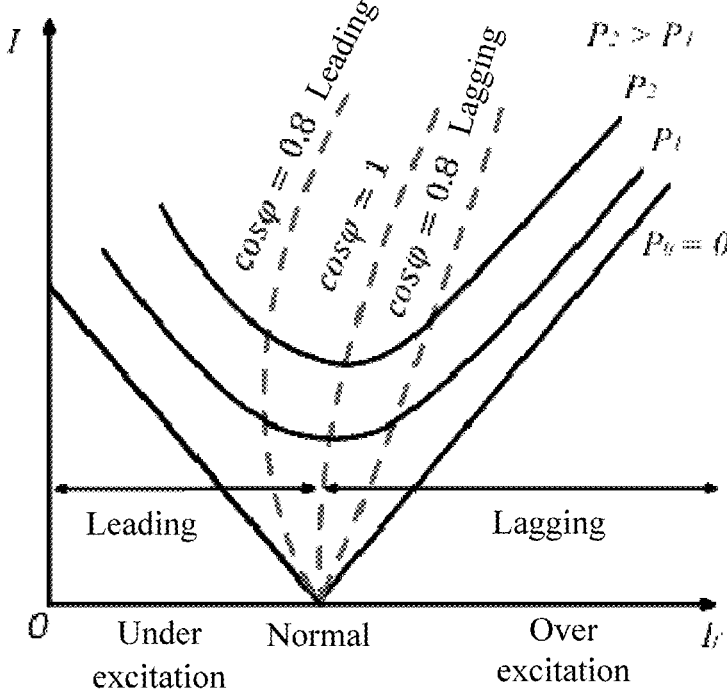
FIG. 6 is a V-shaped curve diagram of a synchronous generator according to an embodiment of the present disclosure.

It should be noted that the system may also receive the reactive power dispatching command in the power dispatching mode. That is, in the second state, if the system also receives the reactive power dispatching command, since the stator voltage of the first synchronous motor M1 is maintained by the excitation system of the first synchronous motor M1, the photovoltaic inverter 102 does not need to output reactive power. Rather, the reactive power command value will be transmitted to the excitation system of the second synchronous motor M2 to achieve different power factors by adjusting the excitation current of the second synchronous motor M2. That is, while performing step S102, the control method may also include step S103 as shown in FIG. 5. In step S103, an excitation current of the second synchronous motor is controlled to achieve a corresponding power factor according to a reactive power command value in a received reactive power dispatching command. The relationship between excitation current and power factor of synchronous motor is shown in FIG. 6. In FIG. 6, the ordinate I represents the armature current in the stator winding, and the abscissa If represents the excitation current in the rotor, where $\varphi$ represents the power factor angle, cos φ represents the power factor, and $P_0$, $P_1$ and $P_2$ represent the three different powers of synchronous motor.

In practical applications, there is another state in the system, specifically as follows.

In a third state: the photovoltaic power station does not generate electricity, the photovoltaic inverter 102 is disconnected from the synchronous motor back-to-back drive system 103, and the synchronous motor back-to-back drive system 103 operates in the synchronous condenser mode.

The transition process from the first state, the second state to the third state may be as follows:

(1) As the light intensity decreases, the mechanical power of the first synchronous motor M1 as the prime mover gradually decreases, and the rotor decelerates. The power angle θ and the electromagnetic power of the second synchronous motor M2 decreases. When the power angle θ decreases to 0, the second synchronous motor M2 becomes no-load, and the input power of the second synchronous motor M2 just offsets the no-load loss.

(2) When the output power of the photovoltaic inverter 102 is further reduced, the power angle θ and electromagnetic power of the second synchronous motor M2 become negative, the second synchronous motor M2 receives power from the power grid to offset the no-load losses, and the second Synchronous motor M2 is switched from the generator mode to the motor mode.

(3) When the sun completely sets, the photovoltaic power station does not generate electricity at night, the alternating current side of the photovoltaic inverter 102 no longer inputs power to the synchronous motor back-to-back drive system 103, and the synchronous motor back-to-back drive system 103 becomes a condenser that maintains a synchronous idle speed.

Figure 7:
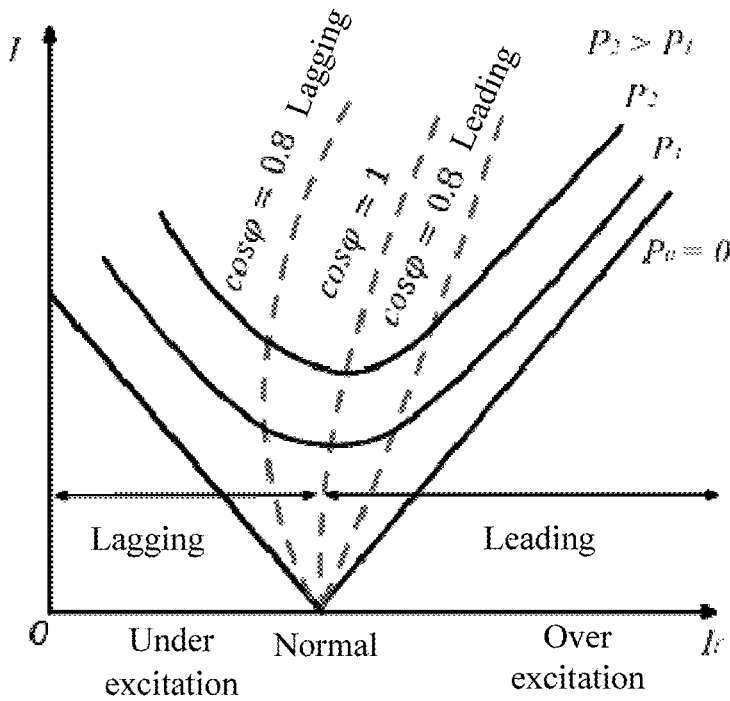
FIG. 7 is a V-shaped curve diagram of a synchronous condenser according to an embodiment of the present disclosure.

Similar to the synchronous generator, the synchronous condenser can provide reactive power and voltage compensation for the power grid. Similar to the second state, the synchronous motor achieves reactive power control through the excitation current control. The synchronous condenser also has a similar V-shaped curve, as shown in FIG. 7. In FIG. 7, the ordinate I represents the armature current in the stator winding, the abscissa If represents the excitation current in the rotor, φ represents the power factor angle, cos φ represents the power factor, and $P_0$, $P_1$ and $P_2$ represent three different powers of the synchronous motor. Furthermore, similar to the synchronous generator, the synchronous condenser can also provide strong resistance to voltage and current, improve the system inertia, optimize the system frequency characteristic, and improve the system frequency stability and frequency support capability.

In an embodiment, before or after any step, the control method may further includes: controlling, when the stator winding of the first synchronous motor has no input power, the synchronous motor back-to-back drive system to operate in the synchronous condenser mode.

Figure 8:
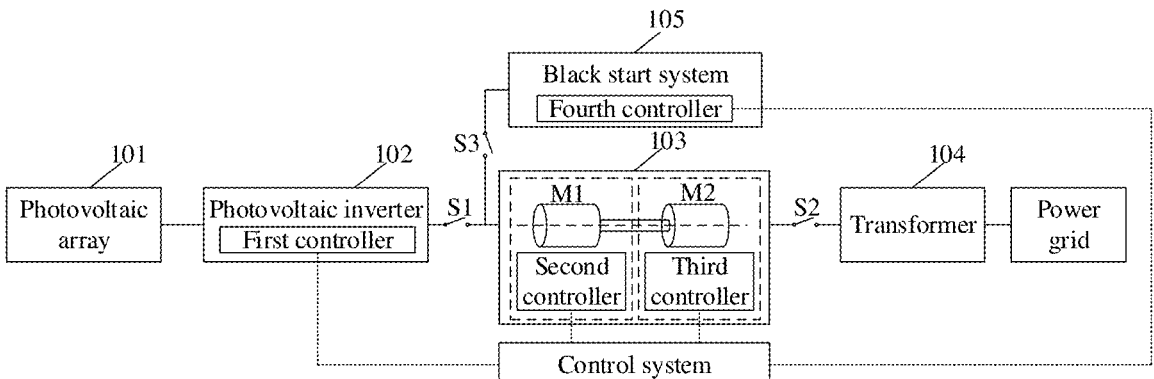
FIG. 8 is a schematic structural diagram of a photovoltaic grid-connected system according to another embodiment of the present disclosure.

On the basis of the above embodiments, in order to realize a first startup of the system, as shown in FIG. 8, the photovoltaic grid-connected system may further include: a black start system 105, a first switch S1, a second switch S2 and a third switch S3. The first switch S1 is arranged between the alternating current side of the photovoltaic inverter 102 and the stator winding of the first synchronous motor M1, which may refer to a switch in the switch cabinet of the photovoltaic inverter 102. The black start system 105 is connected to the stator winding of the first synchronous motor M1 through the third switch S3. The second switch S2 is arranged between the stator winding of the second synchronous motor M2 and the transformer 104, which may refer to a grid-connected switch of the synchronous motor back-to-back drive system 103.

Figure 9:
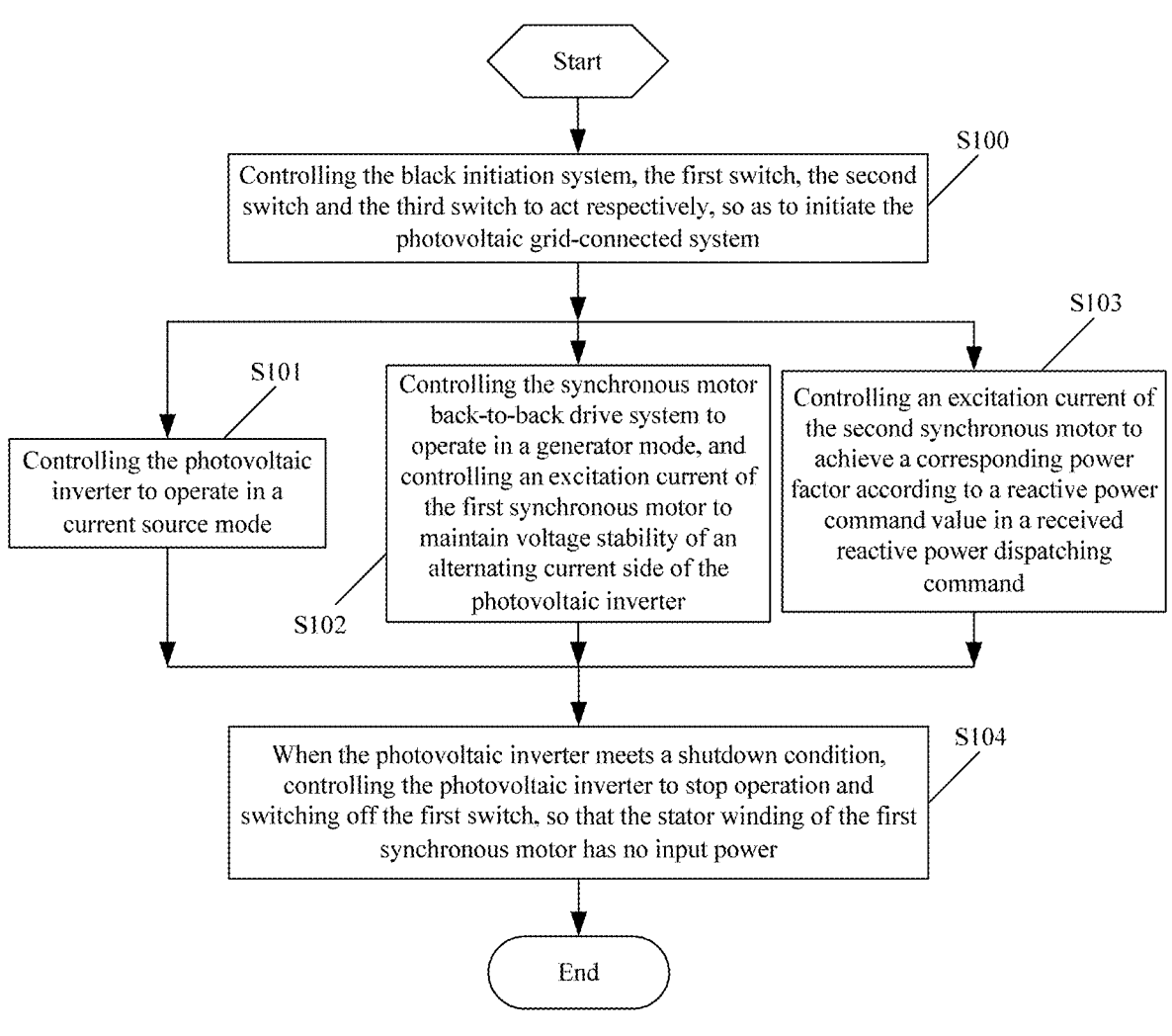
FIG. 9 a flowchart of a control method of a photovoltaic grid-connected system according to another embodiment of the present disclosure.

In an embodiment, before step S101, the control method further includes a step S100 as shown in FIG. 9 (shown on the basis of FIG. 5 as an example).

In step S100, the black start system, the first switch, the second switch and the third switch are controlled to operate respectively to start the photovoltaic grid-connected system.

The first startup of the system can be achieved in this step when all switches are disconnected, that is, when the photovoltaic inverter 102 is disconnected from the synchronous motor back-to-back drive system 103, and the synchronous motor back-to-back drive system 103 is disconnected from the power grid. The step S100 includes the following specific processes:

(1) First, the third switch S3 is controlled to be switched on, to connect the black start system 105 to the stator winding of the first synchronous motor M1 to perform the black start process. The black start process is consistent with the conventional synchronous condenser start process in the conventional technology, the details of which are omitted here for concision.

(2) When the stator speed of the synchronous motor back-to-back drive system 103 reaches the power grid synchronous speed, the second switch S2 is controlled to be switched on and the third switch S3 is controlled to be switched off. In this case, without considering its own losses, the synchronous motor back-to-back drive system 103 has neither mechanical power input and output nor electrical power input and output. The power angle θ of the first synchronous motor M1 and the second synchronous motor M2 are both zero degrees, and the synchronous motor back-to-back drive system 103 operates in the synchronous condenser mode.

(3) When the illumination intensity and direct current voltage of the photovoltaic array 101 meet the power generation condition, the voltage at the stator winding side of the first synchronous motor M1 is adjusted by controlling the excitation current of the first synchronous motor M1, and the voltage at the stator winding of the first synchronous motor M1 is adjusted to be within the operation range of the grid-connected voltage of the photovoltaic inverter 102.

(4) When it is detected that the direct current and alternating current voltage of the photovoltaic inverter 102 meet the starting condition, the photovoltaic inverter 102 starts. The photovoltaic inverter 102 obtains the amplitude, frequency and phase of the stator voltage at the alternating current side of the first synchronous motor M1 through phase lock loop (PLL). Then the direct current at the direct current side of the photovoltaic inverter 102 is converted into the alternating current that is synchronized with the voltage at the stator winding side of the first synchronous motor M1 through pulse width modulation (PWM). That is, the output of the alternating current side of the photovoltaic inverter 102 is adjusted to be the alternating current synchronized with the voltage at the stator winding side of the first synchronous motor M1. And then the first switch S1 is controlled to be switched on, and the whole system is connected to the grid.

In the conventional technology, when the photovoltaic system is not generating electricity, such as rain, snow or at night, the motor needs to be disconnected from the grid and shut down, and when power generation is resumed, the system needs to undergo a black start again. According to the solutions provided in the embodiments of the present disclosure, after the synchronous motor back-to-back drive system 103 is successfully connected to the grid for the first time, if there is no power outage or troubleshooting, there is no need to disconnect from the power grid or reconnect to the power grid. As a result, the startup process is simple and fast, and it can also provide inertia and reactive power support for the power grid at night.

Figure 10A:
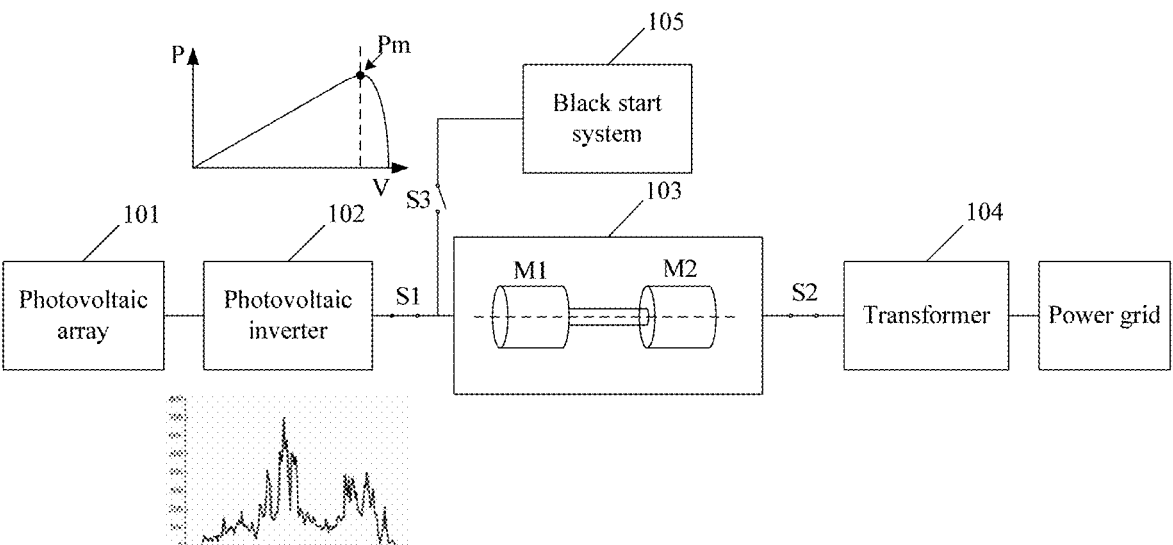
FIG. 10a, FIG. 10b, and FIG. 10c are respectively structural schematic diagrams of a photovoltaic grid-connected system in different states according to an embodiment of the present disclosure.
Figure 10B:
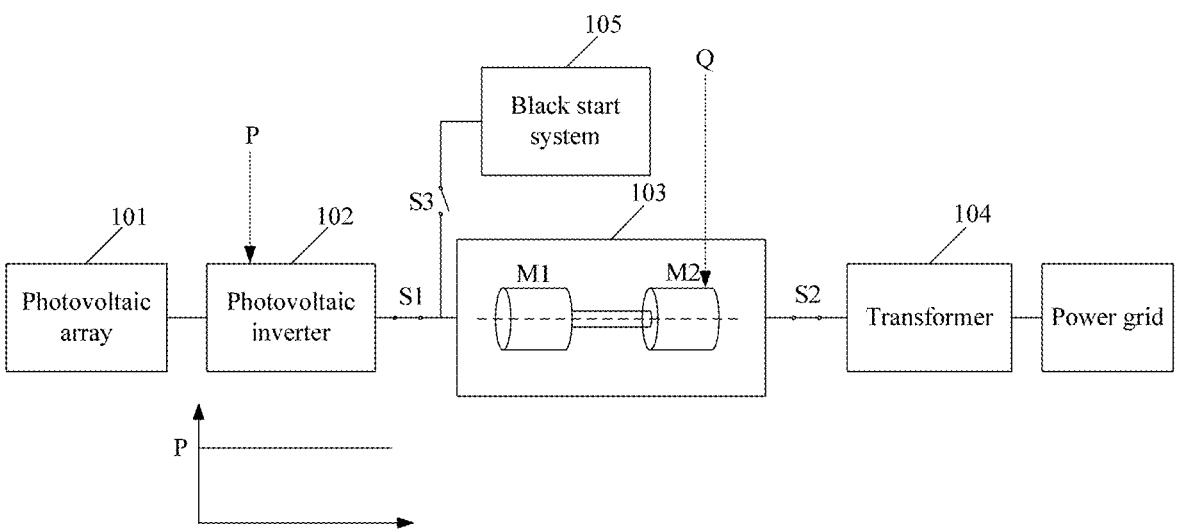
Figure 10C:
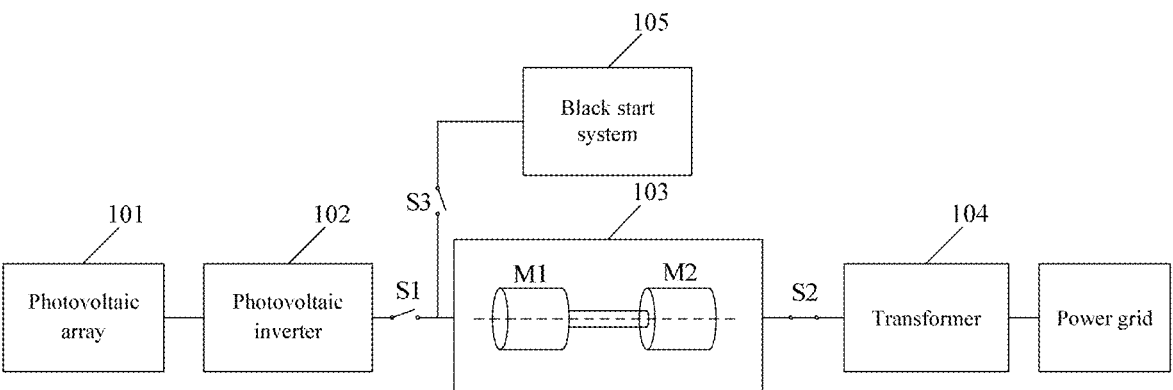

In addition, when the system is in the first state and the second state, both the first switch S1 and the second switch S2 are switched on, and the third switch S3 is switched off. In the first state, as shown in FIG. 10a, the photovoltaic inverter 102 constantly tracks the maximum power point Pm of the photovoltaic array 101, the power/voltage curve is the waveform diagram above the photovoltaic inverter 102 as shown in the FIG. 10a, and the operating power during the daytime is shown in the waveform diagram below the photovoltaic inverter 102 in FIG. 10a. In the second state, the active power of the photovoltaic inverter 102 is maintained at the active power command value P, as shown in the waveform diagram below the photovoltaic inverter 102 in FIG. 10b. The reactive power command value Q in the reactive power dispatching command will be transmitted to the excitation system of the second synchronous motor M2, and the second synchronous motor M2 adjusts the excitation current of the second synchronous motor M2 to achieve different power factors. In the third state, both the first switch S1 and the third switch S3 are switched off, and the second switch S2 is switched on, as shown in FIG. 10c.

Before entering the third state, that is, after entering the first state or the second state through the step S101, as the light intensity decreases, the control method also includes a step S104. In step S104, when the photovoltaic inverter meets a shutdown condition, the photovoltaic inverter is controlled to stop operation and the first switch is controlled to be switched off, so that the stator winding of the first synchronous motor has no input power, thereby, the system enters the third state.

The control method provided in this embodiment not only can be directly applied to existing photovoltaic inverter products without modification, but also supports various inverter operation modes such as the MPPT mode and the power dispatching mode. In addition, it can also be connected to the grid during the daytime for power generation and operate in the synchronous condenser mode by the synchronous motor back-to-back drive system when there is no photovoltaic power generation at night, so that the photovoltaic grid-connected system can still constantly, automatically and timely share the disturbances of the power grid.

According to another embodiment of the present disclosure, a photovoltaic grid-connected system is provided as shown in FIG. 1. The system includes: a photovoltaic array 101, at least one photovoltaic inverter 102, a synchronous motor back-to-back drive system 103, a transformer 104 and a control system (not shown in the figure).

The synchronous motor back-to-back drive system 103 includes: a first synchronous motor M1 and a second synchronous motor M2, and the rotor shafts of the two synchronous motors are connected through a mechanical shaft so that the two always maintain the same speed.

The direct current side of the photovoltaic inverter 102 is connected to the corresponding photovoltaic string in the photovoltaic array 101, the alternating current side of the photovoltaic inverter 102 is connected to the stator winding of the first synchronous motor M1, and the stator winding of the second synchronous motor M2 is connected to the power grid through the transformer 104. Furthermore, the alternating current generated by the photovoltaic array 101 is converted into three-phase alternating current by the photovoltaic inverter 102 and connected to the three-phase stator input of one synchronous motor M1 of the synchronous motor back-to-back drive system 103. The output side of the synchronous motor back-to-back drive system 103 is the three-phase stator winding port of the other synchronous motor M2, which is connected to the transformer 104 for boosting and then connected to the power grid.

In an embodiment, as shown in FIG. 8, the photovoltaic grid-connected system further includes: a black start system 105, a first switch S1, a second switch S2, and a third switch S3.

The first switch S1 is arranged between the alternating current side of the photovoltaic inverter 102 and the stator winding of the first synchronous motor M1.

The black start system 103 is connected to the stator winding of the first synchronous motor M1 through the third switch S3.

The second switch S2 is arranged between the stator winding of the second synchronous motor M2 and the transformer 104.

The control system is used to perform the control method for the photovoltaic grid-connected system as described in any one of the above-mentioned embodiments. The specific process and principle of the control method can refer to the above-mentioned embodiments, the details of which are omitted here for concision.

The above-mentioned photovoltaic inverter 102 may be a conventional photovoltaic DC/AC converter that is currently common, requiring no additional modification, and the control mode in the present disclosure is flexible. That is, the currently popular MPPT current source control mode can be used to track the maximum power point of the photovoltaic array 101 and connect all the power generated on the photovoltaic side to the grid. Alternatively, the power command mode can also be used to respond to active and reactive power command scheduling below the maximum power of the photovoltaic array 101.

In addition, the synchronous motor back-to-back drive system 103 always operates at the synchronous speed of the power grid after the first black start. When the photovoltaic power station has electric energy input (daytime), the synchronous motor back-to-back drive system 103 operates in the generator mode. When there is no power output from the photovoltaic system (at night), the synchronous motor back-to-back drive system 103 operates in the synchronous condenser mode. In this way, it can continuously provide inertia support and reactive power support for the power grid for 24 hours a day, improving the frequency and voltage stability of the power grid.

In practical applications, the control system may include controllers respectively configured inside each device. Specifically, the control system includes: a first controller integrated in the photovoltaic inverter 103, which is configured for controlling operation of the photovoltaic inverter; a second controller integrated in the first synchronous motor M1, which is configured for controlling the excitation current of the first synchronous motor; a third controller integrated in the second synchronous motor M2, which is configured for controlling an excitation current of the second synchronous motor; and a fourth controller integrated in the black start system 105, which is configured for controlling the black start system to perform a black start process.

In practical applications, the first controller may be responsible for communicating with the outside world, receiving the active power dispatching command and reactive power dispatching command and so on. Furthermore, the first controller is communicatively connected with the second controller, the third controller and the fourth controller respectively, thereby enabling control of the excitation current of the corresponding synchronous motor, and the like. Nevertheless, the embodiment of present disclosure is not limited here. The control system may also be configured with additional system controllers that are responsible for communicating with the outside world, and communicating and connecting with the second controller, the third controller and the fourth controller respectively. It depends on the specific application environment and is within the protection scope of the present disclosure.

The same and similar parts of the various embodiments in this specification can be referred to each other, and each embodiment focuses on the differences from other embodiments. In particular, for the system or the system embodiment, since it is basically similar to the method embodiment, the description is relatively simple. The related parts can refer to the part of the description of the method embodiment. The systems and system embodiments described above are merely illustrative, and the units described as separate components may or may not be physically separated, and the components shown as units may or may not be physical units, that is, they can be located in one place, or they can be distributed to multiple network elements. Part or all of the modules can be selected according to practical needs to achieve the purpose of the solution of this embodiment. It can be understood and implemented by those skilled in the art without creative efforts.

Professionals can further realize that the units and algorithm steps of the examples described in conjunction with the embodiments disclosed herein can be implemented by electronic hardware, computer software or a combination of the two. In order to clearly illustrate the possible interchangeability of the hardware and software, in the above description, the composition and steps of each example have been generally described according to their functions. Whether these functions are executed by hardware or software depends on the specific applications and design constraints of the technical solution. Those skilled in the art may use different methods to implement the described functions for each specific application, but such implementation should not be regarded as beyond the scope of the present disclosure.

According to the above description of the disclosed embodiments, the features recorded in each embodiment in this specification can be replaced or combined with each other, so that those skilled in the art can realize or use the present disclosure. Various modifications to these embodiments will be readily apparent to those skilled in the art, and the general principles defined herein may be applied to other embodiments without departing from the spirit or scope of the present disclosure. Therefore, the present disclosure should not be limited to the embodiments disclosed herein, rather has the widest scope in accordance with the principle and the novel features disclosed herein.

The invention claimed is:

1. A control method for a photovoltaic grid-connected system, wherein the photovoltaic grid-connected system comprises a photovoltaic array, a photovoltaic inverter, a synchronous motor back-to-back drive system and a transformer connected in series in sequence, the transformer is configured to connect to a power grid, and in the synchronous motor back-to-back drive system, a rotor shaft of a first synchronous motor and a rotor shaft of a second synchronous motor are connected through a mechanical shaft;

wherein the control method comprises:

controlling the photovoltaic inverter to operate in a maximum power point tracking (MPPT) current source mode after the photovoltaic grid-connected system is started; and controlling the synchronous motor back-to-back drive system to operate in a generator mode; and controlling, in response to changing of a stator current of the first synchronous motor, an excitation electromotive force of the first synchronous motor, to maintain voltage stability of an alternating current side of the photovoltaic inverter, wherein the voltage stability of the alternating current side of the photovoltaic inverter is related to the stator current of the first synchronous motor and the excitation electromotive force of the first synchronous motor.

2. The control method according to claim 1, wherein the controlling the photovoltaic inverter to operate in the current source mode further comprises:

controlling, when an active power dispatching command is received and an active power command value is less than a maximum power of the photovoltaic array, the photovoltaic inverter to operate in the current source mode according to the active power command value.

3. The control method according to claim 1, wherein when controlling the synchronous motor back-to-back drive system to operate in the generator mode, the method further comprises:

controlling an excitation current of the second synchronous motor to achieve a corresponding power factor according to a reactive power command value in a received reactive power dispatching command.

4. The control method according to claim 1, wherein before or after any step, the method further comprises:

controlling, when a stator winding of the first synchronous motor has no input power, the synchronous motor back-to-back drive system to operate in a synchronous condenser mode.

5. The control method according to claim 1, wherein the photovoltaic grid-connected system further comprises a black start system, a first switch, a second switch and a third switch, the first switch is arranged between an alternating current side of the photovoltaic inverter and a stator winding of the first synchronous motor, the black start system is connected to the stator winding of the first synchronous motor through the third switch, and the second switch is arranged between a stator winding of the second synchronous motor and the transformer;

wherein before the controlling the photovoltaic inverter to operate in the current source mode, the method further comprises:

controlling the black start system, the first switch, the second switch and the third switch to operate respectively to start the photovoltaic grid-connected system.

6. The control method according to claim 5, wherein the controlling the black start system, the first switch, the second switch and the third switch to operate respectively to start the photovoltaic grid-connected system comprises:

switching on the third switch to connect the black start system to the stator winding of the first synchronous motor to perform a black start process;

switching on the second switch and switching off the third switch when a stator speed of the synchronous motor back-to-back drive system reaches a power grid synchronous speed, so that the synchronous motor back-to-back drive system operates in a synchronous condenser mode;

controlling, when the photovoltaic array meets a power generation condition, the excitation current of the first synchronous motor to adjust a voltage at a stator winding side of the first synchronous motor to be within an operation range of a grid-connected voltage of the photovoltaic inverter; and adjusting, when the photovoltaic inverter meets a start condition, an output at the alternating current side of the photovoltaic inverter to an alternating current synchronized with the voltage at the stator winding side of the first synchronous motor, and switching on the first switch.

7. The control method according to claim 5, wherein after the controlling the photovoltaic inverter to operate in the current source mode, the method further comprises:

controlling, when the photovoltaic inverter meets a shutdown condition, the photovoltaic inverter to stop operation, and switching off the first switch, so that the stator winding of the first synchronous motor has no input power.

8. The control method according to claim 5, wherein the excitation electromotive force of the first synchronous motor is controlled by changing an air gap main magnetic flux, and the air gap main magnetic flux is related to an excitation current of the first synchronous motor.

9. A photovoltaic grid-connected system, comprising: a photovoltaic array, at least one photovoltaic inverter, a synchronous motor back-to-back drive system, a transformer and a control system; wherein the synchronous motor back-to-back drive system comprises a first synchronous motor and a second synchronous motor, and a rotor shaft of the first synchronous motor and a rotor shaft of the second synchronous motor are connected through a mechanical shaft;

a direct current side of the at least one photovoltaic inverter is connected to a corresponding photovoltaic string in the photovoltaic array;

an alternating current side of the at least one photovoltaic inverter is connected to a stator winding of the first synchronous motor; and a stator winding of the second synchronous motor is connected to a power grid through the transformer;

wherein the control system is configured to execute a control method, the control method comprising:

controlling the at least one photovoltaic inverter to operate in a maximum power point tracking (MPPT) current source mode after the photovoltaic grid-connected system is started;

controlling the synchronous motor back-to-back drive system to operate in a generator mode; and controlling, in response to changing of a stator current of the first synchronous motor an excitation electromotive force of the first synchronous motor, to maintain voltage stability of the alternating current side of the at least one photovoltaic inverter, wherein the voltage stability of the alternating current side of the photovoltaic inverter is related to the stator current of the first synchronous motor and the excitation electromotive force of the first synchronous motor.

10. The photovoltaic grid-connected system according to claim 9, further comprising: a black start system, a first switch, a second switch and a third switch; wherein the first switch is arranged between the alternating current side of the at least one photovoltaic inverter and the stator winding of the first synchronous motor;

the black start system is connected to the stator winding of the first synchronous motor through the third switch; and the second switch is arranged between the stator winding of the second synchronous motor and the transformer.

11. The photovoltaic grid-connected system according to claim 10, wherein the control system comprises: a first controller, a second controller, a third controller, and a fourth controller; wherein the first controller integrated in the at least one photovoltaic inverter is configured for controlling operation of the at least one photovoltaic inverter;

the second controller integrated in the first synchronous motor is configured for controlling the excitation current of the first synchronous motor;

the third controller integrated in the second synchronous motor is configured for controlling an excitation current of the second synchronous motor;

the fourth controller integrated in the black start system is configured for controlling the black start system to perform a black start process; and the first controller is communicatively connected with the second controller, the third controller and the fourth controller, respectively.

12. The photovoltaic grid-connected system according to claim 9, wherein the excitation electromotive force of the first synchronous motor is controlled by changing an air gap main magnetic flux, and the air gap main magnetic flux is related to an excitation current of the first synchronous motor.

* * * * *